United States Patent [19]

Taguchi et al.

[11] Patent Number: 4,581,280
[45] Date of Patent: Apr. 8, 1986

[54] HEAT-BLOCKING GLASS

[75] Inventors: Takashi Taguchi; Tadashi Hattori; Susumu Sato; Yoshiki Ueno, all of Okazaki, Japan

[73] Assignee: Nippon Soken, Inc., Nishio, Japan

[21] Appl. No.: 515,873

[22] Filed: Jul. 21, 1983

[30] Foreign Application Priority Data

Sep. 7, 1982 [JP] Japan .................................. 57-156077

[51] Int. Cl.$^4$ .......................... B32B 9/04; B32B 13/04
[52] U.S. Cl. .................................... 428/212; 428/701; 428/702; 428/446; 428/432
[58] Field of Search ............... 428/701, 702, 446, 212, 428/432

[56] References Cited

U.S. PATENT DOCUMENTS

| Re. 25,767 | 4/1965 | Auffenorde et al. |
|---|---|---|
| 2,617,741 | 11/1952 | Lytle ................................ 428/701 X |
| 2,624,823 | 1/1953 | Lytle . |
| 2,698,261 | 12/1954 | Gaiser . |
| 2,772,190 | 11/1956 | Haayman et al. ............... 428/701 X |
| 3,053,698 | 9/1962 | Ogle, Jr. et al. . |
| 3,149,989 | 9/1964 | Johnson ........................... 428/701 X |
| 3,356,522 | 12/1967 | Libbert . |
| 3,356,523 | 12/1967 | Libbert . |
| 3,853,386 | 12/1974 | Ritter et al. ...................... 428/701 X |
| 4,070,781 | 1/1978 | Sauer . |
| 4,128,303 | 12/1978 | Onoki et al. . |
| 4,244,997 | 1/1981 | Postupack . |
| 4,286,009 | 8/1981 | Griest .............................. 428/701 X |

FOREIGN PATENT DOCUMENTS 0181503 11/1982 Japan ................................... 428/699

OTHER PUBLICATIONS

Optics of Thin Films-Basic Dielectric Design Units, pp. 104-105, pp. 152-153.

Primary Examiner—George F. Lesmes
Assistant Examiner—Nancy A. B. Swisher
Attorney, Agent, or Firm—Cushman, Darby & Cushman

[57] ABSTRACT

A heat-blocking glass comprising: a first layer of infrared rays-blocking film of any thickness formed on a substrate; a plurality of intermediate layers from a second to a (2n+2)th layer (n: positive integral) stacked on said first layer, the optical thickness of each intermediate layer being $\lambda/4$ ($\lambda$: design wavelength); and an uppermost (+3)th layer of a $\lambda/8$ optical thickness. The refractive index of the first layer is smaller than the refractive index of the second layer. The refractive index of each layer from the second layer to the uppermost layer is arranged so that high-refractive-index layers and low-refractive-index layers are alternately stacked, the second layer being disposed as a high-refractive-index layer.

4 Claims, 4 Drawing Figures

HEAT-BLOCKING GLASS

BACKGROUND OF THE INVENTION

1. Field of the Invention

The present invention relates to a heat-blocking glass which is applied to the windshield of a vehicle or to a windowpane of a building so as to decrease the cooling load of the cooling system thereof by inhibiting the penetration of heat rays into the interior thereof.

2. Description of the Prior Art

One type of conventional heat-blocking glass comprises a multi-layer interference film as a heat-blocking film, the interference film being coated on a glass substrate. In general, conventional heat-blocking glass does not effectively block heat rays since its range of reflection of the wave-length of heat rays is narrow. To widen the range of reflection, the number of layers of the film must be increased, thereby increasing the cost thereof.

Another type of conventional heat-blocking glass comprises a multi-layer interference film coated on one side of the glass substrate and an infrared rays-blocking film coated on the other side of the glass substrate so as to enhance the blocking of heat rays. However, this heat-blocking glass involves a problem in that visible rays are reflected by the infrared rays-blocking film. In order to eliminate this problem, one or more anti-reflection films must be coated on the infrared rays-blocking film, thereby increasing the cost thereof.

SUMMARY OF THE INVENTION

An object of the present invention is to provide a heat-blocking glass having a small number of layers of heat-blocking film and having a small reflection factor with respect to visible rays which can effectively block heat rays.

A heat-blocking glass according to the present invention comprises: a first layer of infrared rays-blocking film of, e.g., $In_2O_3$-$SnO_2$ of any thickness formed on a substrate; a plurality of intermediate layers from a second to a $(2n+2)$th layer (n: positive integral) of a $\lambda/4$ optical thickness; an uppermost layer of a $\lambda/8$ optical thickness, the refractive index of each layer from the second to the uppermost layer being arranged so that high-refractive-index layers and low-refractive-index layers are alternately stacked, the second layer being disposed as a high-refractive-index layer.

Intermediate layers of a $\lambda/4$ optical thickness, e.g., five layers from the second to the sixth layer (n=2), reflect infrared rays of a wavelength within a certain wavelength range corresponding to the reflection characteristic of the five layers. Infrared rays of a wavelength outside of the above-mentioned wavelength range penetrate through the intermediate layers but are blocked by the first layer of infrared rays-blocking film.

The heat-blocking glass of the present invention is advantageous over the prior art in that the number of heat-blocking film layers can be decreased without degrading the heat-blocking ability thereof and visible rays can sufficiently penetrate therethrough.

The embodiments of the present invention are described hereinafter with reference to the drawings.

DESCRIPTION OF THE PREFERRED EMBODIMENTS

Figure 1:
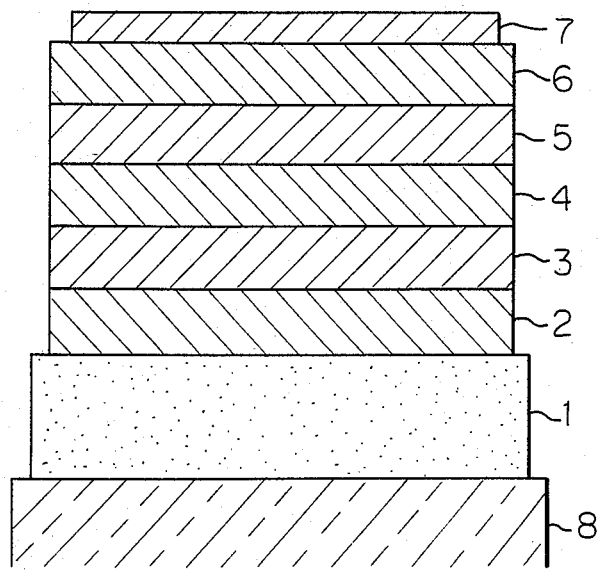
FIG. 1 is a sectional view of a heat-blocking glass according to the present invention.

An example of the construction of the heat-blocking glass of the present invention is illustrated in FIG. 1. The heat-blocking glass comprises five intermediate layers (n=2) of a $\lambda/4$ optical thickness, i.e., a second layer 2 to a sixth layer 6. The letter $\lambda$ indicates the design wavelength, i.e., the central wavelength, of a heat ray to be blocked. The optical thickness is defined as (actual thickness of the film )×(refractive index of the film). A plurality of layers 1 to 7 which form a heat-blocking film is stacked on a glass substrate 8 of a refractive index $n_g$ of 1.53. The first layer 1 comprises an infrared rays-blocking film of any thickness and having a high transparency with respect to visible rays. Such an infrared rays-blocking film is made from, for example, $In_2O_3$-$SnO_2$ or $SnO_2$-$Sb_2O_3$. The second layer 2, the fourth layer 4, and the sixth layer 6 are made of $TiO_2$ of a high refractive index higher than that of the first layer and have an optical thickness of $\lambda/4$. The third layer 3 and the fifth layer 5 are made of $SiO_2$ of a low refractive index and have an optical thickness of $\lambda/4$. The uppermost seventh layer 7 is made of $SiO_2$ of a low refractive index and has an optical thickness of $\lambda/8$. Each layer is formed on the substrate by an evaporation method, a sputtering method, or a dipping method. When a beam of light is irradiated onto the heat-blocking glass from above, infrared rays in the light having a central wavelength of about $\lambda$ are reflected by the intermediate layers 2 to 6 of a $\lambda/4$ optical thickness. Other infrared rays in the light having a central wavelength of other than $\lambda$ or thereabouts, which rays penetrate through the intermediate layers, are blocked by the first layer 1 of the infrared rays-blocking film. Infrared rays are similarly reflected and blocked by the infrared rays-blocking film when a beam of light is irradiated onto the glass from below. A heat-blocking glass of this structure can more effectively block heat rays than can the heat-blocking glass of the prior art. The seventh layer 7 is disposed on the uppermost intermediate layer so as to suppress the reflection of visible rays.

Figure 2:
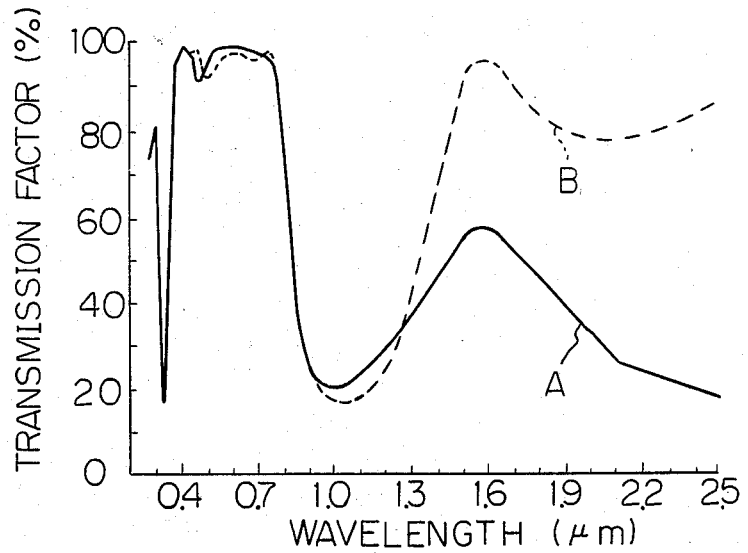
FIG. 2 is a graph showing an effect of the heat-blocking glass of FIG. 1.

FIG. 2 is a graph which shows the transmission factor of the heat-blocking glass with respect to the wavelength of the light irradiated onto the glass, in which glass the first layer 1 is made of an $In_2O_3$-$SnO_2$ film 2,000 Å thick and $\lambda = 1.05$ μm. The solid line A represents the heat-blocking glass of FIG. 1, and the broken line B represents the heat-blocking glass of FIG. 1 with the first layer 1 being omitted therefrom. As can be seen from FIG. 2, the transmission factor of line A for a long wave-length is lower than that of line B while the transmission factor of line A for visible rays (0.4 to 0.7 μm) is almost the same as that of line B, indicating that the heat-blocking glass provided with the first layer 1 can more effectively block heat rays than can the heat-blocking glass not provided with the first layer 1 without the transparency thereof being degraded. In the heat-blocking glass provided with the first layer 1, the blocking factor for visible rays (0.4 to 0.7 μm) is 4% and the blocking factor for infrared rays (0.7 to 2.5 μm) is 58% with respect to a beam of light having an air mass of zero. In the heat-blocking glass not provided with the first layer 1, the blocking factor for visible rays is 4% and the blocking factor for infrared rays is 53% with respect to a beam of light having an air mass of zero. The difference in the blocking factor for infrared rays between the two kinds of heat-blocking glass is only 5% with respect to a beam of light having an air mass of zero. The reason for this is that the direct rays of the sun include only a few rays having a wavelength of over 2 $\mu$m. In actuality, there are radiation rays from buildings or other objects which are heated by the rays of the sun. Such radiation rays comprise rays of a wavelength of over 2 $\mu$m and are effectively blocked by the first layer 1 of infrared rays-blocking film of the heat-blocking glass of the present invention. Therefore, the heat-blocking glass of the present invention when used as the windshield of a vehicle or as a windowpane of a building is very effective for blocking heat rays.

The first layer of infrared rays-blocking film may be disposed on the substrate surface opposite to the surface on which the intermediate layers of a $\lambda/4$ optical thickness are stacked instead of being disposed under the intermediate layers on the substrate surface, as is the case of the above-mentioned embodiment. However, in such an arrangement, it is necessary to dispose one or more layers of an anti-reflection film on the infrared rays-blocking film so as to suppress the reflection of visible rays, thereby increasing the cost thereof.

The thickness of the first layer of infrared rays-blocking film is not limited to 2,000 Å. An infrared rays-blocking film of any thickness may be used as the first layer of the heat-blocking glass.

Figure 3:
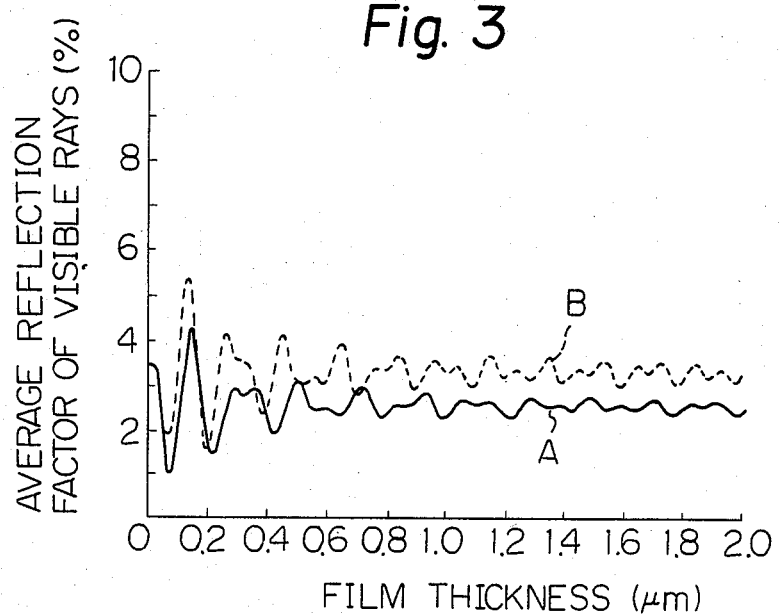
FIG. 3 is a graph showing another effect of the heat-blocking glass of FIG. 1.

FIG. 3 is a graph which shows the average reflection factor of visible rays with respect to the film thickness of the first layer. The solid line A indicates a case in which the refractive index of the film is 1.8, and the broken line B indicates a case in which the refractive index is 2.0. As can be seen from FIG. 3, the average reflection factor of visible rays does not increase but approaches a constant level in accordance with an increase in the film thickness. Line A approaches a level of about 2.5% of the average reflection factor, and line B approaches a level of about 3.3% of the average reflection factor. Such average levels of the reflection factor of the infrared rays-blocking film are small when compared to the reflection factor of the glass. Therefore, it is possible to thicken the infrared rays-blocking film so as to enhance the blocking ability thereof without degrading the transparency of the film by increasing the reflection factor.

$In_2O_3$-$SnO_2$ and $SnO_2$-$Sb_2O_3$, one of which is the material of the infrared rays-blocking film, are electric conductive materials. Therefore, it is possible to use the infrared rays-blocking film as a heater by applying an electric current thereto. Also, such an electric conductive material can, in itself, serve as an electromagnetic shield.

The infrared rays-blocking film of the heat-blocking glass represented by line A in FIG. 2 is made of $IN_2O_3$-$SnO_2$, which comprises 95 wt % of $In_2O_3$ and 5 wt % of $SnO_2$, and is coated on the glass substrate by evaporation in vacuum. The heat-blocking characteristic of the film changes in accordance with a change in the components of the film material or the coating method. However, it is easy to obtain by a method other than evaporation an infrared rays-blocking film having a heat-blocking abiltiy similar to that represented by line A in FIG. 2 and comprising differenet components.

Figure 4:
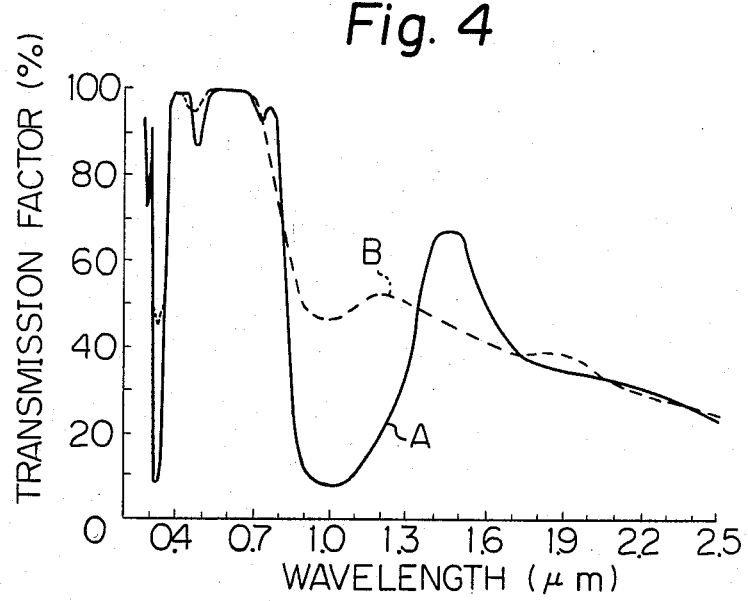
FIG. 4 is a graph showing the effect of another example of the heat-blocking glass of the present invention.

The heat-blocking characteristic of another embodiment of the present invention is depicted in the graph of FIG. 4. The graph shows the transmission factor of the heat-blocking glass in which n is changed with respect to the wavelength. The solid line A indicates a case in which n=3, i.e., a heat-blocking glass which comprises seven intermediate layers of a $\lambda/4$ optical thickness between the uppermost layer and the first layer. The broken line B indicates a case in which n=1, i.e., a heat-blocking glass which comprises three intermediate layers of a $\lambda/4$ optical thickness between the uppermost layer and the first layer. The material of, thickness of and the method of coating of each layer of the heat-blocking glass of line A and of line B are the same as those of the heat-blocking glass of FIG. 1. As can be seen from FIG. 4, in the reflection zone (about 0.8 to 1.3 $\mu$m) in which rays are reflected by the intermediate layers, the transmission factor is low, i.e., the reflection factor is high, when n is large. However, with respect to rays of a long wavelength beyond the reflection zone, the heat-blocking glass of both line A and line B has a sufficient heat-blocking ability. Also, the heat-blocking glass of both line A and line B has a transparency sufficient for visible rays (0.4 to 0.7 $\mu$m).

We claim:

1. A heat-blocking glass comprising: a transparent and conductive first layer of infrared rays-blocking film comprising $In_2O_3$-$SnO_2$ of any thickness formed on a substrate; a plurality of intermediate layers from a second to a (2n+2)th layer (n: positive integral) stacked on said first layer, the optical thickness of each intermediate layer being $\lambda/4$ ($\lambda$: design wavelength); and an uppermost (2n+3)th layer of a $\lambda/8$ optical thickness for anti-reflection of visible rays, the refractive index of said first layer being smaller than the refractive index of said second layer, the refractive index of each layer from said second layer to said uppermost layer being arranged so that high-refractive-index layers and low-refractive-index layers are alternately stacked, said second layer being disposed as a high-refractive-index layer.

2. A heat-blocking glass as set forth in claim 1, in which, each of said high-refractive-index layers comprises a film of $TiO_2$, and each of said low-refractive-index layers comprises a film of $SiO_2$.

3. A heat-blocking glass as set forth in claim 1, in which n is a number between 1 and 3.

4. A structure for transmitting therethrough seleted wavelengths of radiation impinging upon an uppermost radiation-receiving surface thereof, consisting essentially of:

substrate means for transmitting radiation therethrough;

first layer means, disposed on said substrate means and defining a first receiving surface, for transmitting, to said substrate means from said first surface, radiation having a wavelength within the range of 0.4 $\mu$m to 0.7 $\mu$m and for reflecting radiation impinging on said first surface having a wavelength in the range of between 0.7 $\mu$m and 2.5 $\mu$m, said first layer means comprising an $In_2O_3$-$SnO_2$ film;

second layer means disposed on said first surface and defining a second radiation-receiving surface, for transmitting, from said second surface to said first layer means, radiation having a wavelength within the range of 0.4 $\mu$m to 0.7 $\mu$m and for reflecting radiation of a predetermined wavelength $\lambda$ in the range of between 0.7 $\mu$m and 2.5 $\mu$m impinging on said second surface, said second layer means comprising a predetermined number 2n+2 of stacked, substantially parallel intermediate layers each having an optical thickness of $\lambda/4$, n being an integer, adjacent ones of said intermediate layers having different indexes of refraction, the one of said intermediate layers disposed on said first surface having an index of refraction less than the index of refraction of the one of said intermediate layers adjacent thereto, an uppermost one of said intermediate layers defining said second surface; and third layer means, disposed on said second surface and defining a third radiation-receiving surface, for transmitting radiation impinging on said third surface to said second layer means and for suppressing the reflection of radiation having a wavelength within the range of 0.4 $\mu$m to 0.7 $\mu$m impinging on said third surface, said third layer means having an optical thickness of $\lambda/8$, said third surface comprising the uppermost surface of said structure upon which radiation impinges said structure.

* * * * *